(12) United States Patent
Pope et al.

(10) Patent No.: US 11,146,508 B2
(45) Date of Patent: *Oct. 12, 2021

(54) DATA PROCESSING SYSTEM

(71) Applicant: XILINX, INC., San Jose, CA (US)

(72) Inventors: Steven L. Pope, Cambridge (GB);
Kieran Mansley, Girton (GB); Maciej Aleksander Jablonski, Cambridge (GB)

(73) Assignee: XILINX, INC., San Jose, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/978,049

(22) Filed: May 11, 2018

(65) Prior Publication Data

US 2018/0331976 A1 Nov. 15, 2018

Related U.S. Application Data

(63) Continuation-in-part of application No. 15/594,416, filed on May 12, 2017.
(Continued)

(51) Int. Cl.
*H04L 12/931* (2013.01)
*H04L 29/06* (2006.01)
(Continued)

(52) U.S. Cl.
CPC .......... *H04L 49/354* (2013.01); *G06F 9/526* (2013.01); *G06F 9/544* (2013.01); *G06F 9/545* (2013.01);
(Continued)

(58) Field of Classification Search
CPC .......... G06F 9/526; G06F 9/544; G06F 9/545; H04L 49/354; H04L 49/70;
(Continued)

(56) References Cited

U.S. PATENT DOCUMENTS

2005/0226165 A1* 10/2005 Pope ............... G06F 13/10
370/251
2013/0007880 A1* 1/2013 Bosco ............. H04L 63/1458
726/22
(Continued)

FOREIGN PATENT DOCUMENTS

EP         2273375 A1    1/2011

OTHER PUBLICATIONS

EP 18171713.3-1213—Extended European Search Report dated Oct. 5, 2018, 16 pages.
(Continued)

*Primary Examiner* — Thomas J Dailey
(74) *Attorney, Agent, or Firm* — Haynes Beffel & Wolfeld LLP; Andrew L. Dunlap; Paul A. Durdik

(57) ABSTRACT

A data processing system has a poll mode driver and a library supporting protocol processing. The poll mode driver and the library are non-operating system functionalities. An application is provided. An operation system is configured while executing in kernel mode and in response to the application being determined to be unresponsive, use a helper process being an operating system functionality executing at user-mode to cause a receive or transmit mode of the application to continue.

28 Claims, 8 Drawing Sheets

Related U.S. Application Data

(60) Provisional application No. 62/506,405, filed on May 15, 2017.

(51) Int. Cl.
    *H04L 29/08*         (2006.01)
    *G06F 9/54*          (2006.01)
    *H04L 12/861*       (2013.01)
    *G06F 9/52*          (2006.01)

(52) U.S. Cl.
    CPC .......... *H04L 67/2804* (2013.01); *H04L 67/34* (2013.01); *H04L 69/22* (2013.01); *H04L 69/30* (2013.01); *H04L 69/321* (2013.01); *H04L 49/70* (2013.01); *H04L 49/9036* (2013.01); *H04L 69/329* (2013.01)

(58) Field of Classification Search
    CPC . H04L 49/9036; H04L 67/2804; H04L 67/34; H04L 69/22; H04L 69/30; H04L 69/321; H04L 69/329
    See application file for complete search history.

(56) References Cited

U.S. PATENT DOCUMENTS

| | | | | |
|---|---|---|---|---|
| 2015/0016266 | A1* | 1/2015 | Dumitrescu | H04L 47/623 370/236 |
| 2015/0244804 | A1* | 8/2015 | Warfield | H04L 47/621 709/219 |
| 2016/0226957 | A1* | 8/2016 | Zhang | H04L 12/4654 |
| 2017/0134325 | A1* | 5/2017 | Apfelbaum | H04L 47/70 |
| 2017/0163575 | A1* | 6/2017 | Wang | H04L 49/9094 |
| 2017/0180273 | A1* | 6/2017 | Daly | H04L 69/22 |

OTHER PUBLICATIONS

Wind River Systems, "High-Perfomrance Mulit-Core Networking Software Design Options," White Paper, Mar. 11, 2012, pp. 1-13, XP055046578.
U.S. Appl. No. 15/594,416—Response to Restriction Requirement dated Apr. 5, 2019 filed Jul. 26, 2019, 8, pages.
U.S. Appl. No. 15/594,416—Office Action dated Sep. 6, 2019, 21 pages.
U.S. Appl. No. 15/594,416—Response to Office Action dated Sep. 6, 2019 filed Dec. 6, 2019, 13 pages.
U.S. Appl. No. 15/594,416—Final Office Action dated Mar. 13, 2020, 13 pages.
U.S. Appl. No. 15/594,416—Response to Final Office Action dated Mar. 13, 2020, filed May 8, 2020, 15 pages.
U.S. Appl. No. 15/594,416—Office Action dated Jul. 17, 2020, 11 pages.
ExaNIC FPGA Development Kit 1.2 User Guide, 2015 Exablaze Pty. Ltd., Vesroin 1.2, Rev. Jul. 1, 2015, 13 pages.
Zilberman et al., "Where Has My Time Gone?", Univesrity of Cambridge, Apr. 4, 2015, 16 pages, <http://coseners.net/wp-content/uploads/2015/07/NZilberman_Time.pdf>.
Ward et al., "A Bigger Helping of Internet Please!", Apr. 4, 2016, 34 pages, <https://blogs.cisco.com/sp/a-bigger-helping-of-internet-please>.
VPP/What is VPP?, Nov. 23, 2016, 7 pages, <https://wiki.fd.io/index.php?title=VPP/What_is_VPP%3F&oldid=3789>.
Kulkarni et al., "A Survey on TCP/IP API Stacks Based on DPDK," IJARIIE-ISSN(O)-2395-4396, vol. 3., Issue 2, Mar. 26, 2017, pp. 1205-1208, <http://ijariie.com/AdminUploadPdf/A_survey_on_TCP_IP_API_stacks_based_on_DPDK_ijariie4231.pdf>.
DPDK Data Plane Development Kit Programmer's Guide Release 16.07.2, Nov. 30, 2016, 222 pages, <http://fast.dpdk.org/doc/pdf-guides-16.07/prog_guide-16.07.pdf>.
Kelsey, "Libuinet—The FreeBSD TCP/IP Stack as a Userland Library, Plus Extras," May 16, 2014. 33 pages, <https://www.bsdcan.org/2014/schedule/attachments/260_libuinet_bsdcan2014.pdf>.
Awal, TLDK Overview Transport Layer Development Kit, Intel, Apr. 2017, 13 pages, <https://www.dpdk.org/wp-content/uploads/sites/35/2017/04/DPDK-India2017-Awal-TLDK.pdf>.
F-Stack, May 9, 2017, 13 pages, <https://github.com/F-Stack/f-stack/blob/47de44efe7885c89686b329c63fe8ae724fbb913/README.md>.
Park, "DPDK—Data Plave Development Kit—A High-Speed User-Level TCP Stack on DPDK," May 18, 2016, 36 pages, <https://dpdksummit.com/Archive/pdf/2016Asia/DPDK-ChinaAsiaPacificSummit2016-Park-FastUser.pdf>.

\* cited by examiner

DATA PROCESSING SYSTEM

CROSS REFERENCE AND RELATED APPLICATION

This application is a continuation-in-part of U.S. application Ser. No. 15/594,416, entitled "DATA PROCESSING SYSTEM" by Steven L. Pope, Kieran Mansley and Maciej Aleksander Jablonski, filed 12 May 2017, and also claims the benefit of prior U.S. Provisional Patent Application No. 62/506,405, filed 15 May 2017, entitled "DATA PROCESSING SYSTEM," by Steven L. Pope, Kieran Mansley and Maciej Aleksander Jablonski. Both applications are incorporated herein by reference in their entirety.

BACKGROUND OF THE INVENTION

Field

The present application relates to a data processing system having access to a network to transmit and/or receive data.

Background

Data Plane Development Kit DPDK provide libraries and network interface controller drivers to provide relatively fast packet processing. The libraries may be user plane libraries for specific environments. An Environment Abstraction Layer EAL is created which provides a standard programming interface. An EAL may be created for a specific environment. By linking to the library applications can be supported.

DPDK may provide user plane libraries and NIC drivers for a queue manager, a buffer manager, a memory manager, a poll mode driver and/or a packet framework.

DPDK is generally at the user level. A NIC which is supported by DPDK will be configured to receive data from a DPDK driver at the user level.

SUMMARY

According to an aspect, there is provided a data processing system comprising: a processor subsystem having access to a memory and the network interface device capable of supporting a communication link; a first non-operating system functionality for supporting a network interface device; a second non-operating system functionality for performing protocol processing; an application configured in a transmit mode to, while executing on the processor subsystem, form data to be transmitted, cause the data to be written to a data buffer, said first and the second non-operating-system functionalities of the data processing system causing the data to be transmitted over the network via the network interface device; and an operating system configured to, while executing on the processor subsystem in kernel mode and in response to the application being determined to be unresponsive, access the data buffer and its corresponding connection state and request transmission of the data in said data buffer by means of a first helper process, said helper process being an operating system functionality executing at user-mode to cause the data to be transmitted over the network via the network interface device.

The first non-operating-system functionality may comprise a DPDK functionality.

The DPDK functionality may comprise a PMD.

The data processing system may comprise using virtual interface code to communicate between said user level and said kernel.

The helper process may be configured to cause descriptors from said DPDK functionality to be written to a pseudo virtual interface.

The descriptors written to said pseudo virtual interface may be used by said pseudo virtual interface to poll a protocol processing function provided by said operating system executing in kernel mode for updated descriptors.

The polling may be configured to cause a retransmission to be performed via the first helper process.

The polling may be configured to cause scheduling of said application.

The data processing system may comprise a library executing at user mode to provide said second non-operating system functionality.

The protocol processing may comprise TCP processing.

The helper process may be configured to cause said updated descriptors to be written from the pseudo virtual interface to the DPDK functionality.

The data buffer memory may be provided in address space accessible by said application and said operating system.

The data processing system may comprise a second helper process configured to indicate to the operating system a state of said first non-operating-system functionality.

The data processing system may comprise a second helper process configured to indicate to the operating system a presence of data in said data buffer for a given amount of time The data processing system may comprise a second helper process configured to indicate to the operating system that an interface requires attention.

The second helper may be provided on a first core and said second helper may be provided on a different core, said application being provided on said different core.

The data processing system may comprise at least one further application, each application being on a different core with a respective first helper process.

The second helper process may be configured to control each of said respective first helper processes.

The data processing system may comprise a first network interface device and a second network interface device, said first network interface device configured to communicate with said application via said first non-operating system functionality and said second network interface device configured to communicate with said application via user mode virtual interface code and virtual interface code in said operating system.

According to another aspect, there is provided a data processing system comprising: an operating system; an application; a first non-operating system functionality for supporting a network interface device; a second non-operating system functionality for performing protocol processing; a processor subsystem having access to a memory and the network interface device capable of supporting a communication link; wherein said application is configured to, in a receive mode, while executing on the processor subsystem, read received data from a data buffer using said first and second non-operating-system functionalities of the data processing system; the operating system is configured to, while executing on the processor subsystem in kernel mode and in response to the application being determined to be unresponsive, access the data buffer and its corresponding connection state and continue receiving said data by means of a first helper process, said first helper process being an operating system functionality executing at user-mode to cause the receive mode to continue.

The first non-operating-system functionality may comprise a DPDK functionality.

The DPDK functionality comprises a PMD.

The data processing system may comprise using virtual interface code to communicate between said user level and said kernel.

The helper process may be configured to cause descriptors from said DPDK functionality to be written to a pseudo virtual interface.

The descriptors written to said pseudo virtual interface may be used by said pseudo virtual interface to poll a protocol processing function provided by said operating system executing in kernel mode for updated descriptors.

The polling may be configured to cause sockets of said application to be indicated as ready.

The polling may be configured to cause an acknowledgment to be transmitted via said first helper process.

The polling may be configured to cause scheduling of said application.

Frames may be received by the helper, the kernel module performing TCP processing and as a result a call to epoll_wait( ) might complete to indicate that a set of sockets are ready.

The data processing system may comprise a library executing at user mode to provide said second non-operating system functionality.

The protocol processing may comprise TCP processing.

The helper process may be configured to cause said updated descriptors to be written from the pseudo virtual interface to the DPDK functionality.

The data buffer memory may be provided in address space accessible by said application and said operating system.

The data processing system may comprise a second helper process configured to indicate to the operating system a state of said first non-operating-system functionality.

The data processing system may comprise a second helper process configured to indicate to the operating system a presence of data in said data buffer for a given amount of time The data processing system may comprise a second helper process configured to indicate to the operating system that an interface requires attention.

The second helper may be provided on a first core and said second helper is provided on a different core, said application being provided on said different core.

The data processing system may comprise at least one further application, each application being on a different core with a respective first helper process.

According to another aspect, there is provided a method for transmitting data comprising: forming by means of an application data to be transmitted; writing the data to a data buffer; using a first non-operating system functionality supporting a network interface device and a second non-operating-system functionality for performing protocol processing to cause the data to be transmitted over the network via the network interface device; and in response to the application being determined to be unresponsive, accessing by an operating system the data buffer and its corresponding connection state and requesting transmission of the data in said data buffer by means of a first helper process, said helper process being an operating system functionality executing at user-mode to cause the data to be transmitted over the network via the network interface device.

The first non-operating-system functionality may comprise a DPDK functionality.

The DPDK functionality may comprise a PMD.

The method may comprise using virtual interface code to communicate between said user level and said kernel.

The method may comprise using the helper process to cause descriptors from said DPDK functionality to be written to a pseudo virtual interface.

The method may comprise using by said pseudo virtual interface the descriptors to poll a protocol processing function provided by said operating system executing in kernel mode for updated descriptors.

The polling may cause a retransmission to be performed via the first helper process.

The polling may be cause scheduling of said application.

A library executing at user mode may provide said second non-operating system functionality.

The protocol processing may comprise TCP processing.

The method may comprise causing by the first helper process said updated descriptors to be written from the pseudo virtual interface to the DPDK functionality.

The data buffer memory may be provided in address space accessible by said application and said operating system.

The method may comprise indicating, using a second helper process, to the operating system a state of said first non-operating-system functionality.

The method may comprise indicating, using a second helper process, to the operating system a presence of data in said data buffer for a given amount of time The method may comprise indicating, using a second helper process, to the operating system that an interface requires attention.

The second helper may be provided on a first core and said second helper may be provided on a different core, said application being provided on said different core.

At least one further application may be provided, each application being on a different core with a respective first helper process.

The method may comprise controlling by the second helper process each of said respective first helper processes.

The method may comprise communicating with a first network interface device via said first non-operating system functionality and with a second network interface device via user mode virtual interface code and virtual interface code in said operating system.

According to another aspect, there is provided a method for receiving data comprising: reading by an application, in a receive mode, received data from a data buffer using a first non-operating system functionality for supporting a network interface device and a second non-operating system functionality for performing protocol processing; and in response to the application being determined to be unresponsive, accessing by an operating system the data buffer and its corresponding connection state and continue said receiving mode by means of a first helper process, said first helper process being an operating system functionality executing at user-mode to cause the receive mode to continue.

The first non-operating-system functionality may comprise a DPDK functionality.

The DPDK functionality comprises a PMD.

The method may comprise using virtual interface code to communicate between said user level and said kernel.

The method may comprise using helper process to cause descriptors from said DPDK functionality to be written to a pseudo virtual interface.

The method may comprise using by the pseudo virtual interface the descriptors to poll a protocol processing function provided by said operating system executing in kernel mode for updated descriptors.

The polling may cause sockets of said application to be indicated as ready.

The polling may cause an acknowledgment to be transmitted via said first helper process.

The polling may be configured to cause scheduling of said application.

The method may comprise receiving data by the helper, performing by the operating system protocol processing and as a result a call may complete to indicate that a set of sockets are ready.

A library executing at user mode may provide said second non-operating system functionality.

The protocol processing may comprise TCP processing.

The method may comprise causing by the first helper process said updated descriptors to be written from the pseudo virtual interface to the DPDK functionality.

The data buffer memory may be provided in address space accessible by said application and said operating system.

The method may comprise indicating, using a second helper process, to the operating system a state of said first non-operating-system functionality.

The method may comprise indicating, using a second helper process, to the operating system a presence of data in said data buffer for a given amount of time The method may comprise indicating, using a second helper process, to the operating system that an interface requires attention.

The second helper may be provided on a first core and said second helper may be provided on a different core, said application being provided on said different core.

At least one further application may be provided, each application being on a different core with a respective first helper process.

The method may comprise controlling by the second helper process each of said respective first helper processes.

The method may comprise communicating with a first network interface device via said first non-operating system functionality and with a second network interface device via user mode virtual interface code and virtual interface code in said operating system.

According to another aspect, there is provided a non-transitory computer readable medium encoded with instructions for controlling a data processing system, in which the instructions when executed enable the execution of the steps of: reading by an application, in a receive mode, received data from a data buffer using a first non-operating system functionality for supporting a network interface device and a second non-operating system functionality for performing protocol processing; and in response to the application being determined to be unresponsive, accessing by an operating system the data buffer and its corresponding connection state and continue said receive mode by means of a first helper process, said first helper process being an operating system functionality executing at user-mode to cause the receive mode to continue.

According to another aspect, there is provided a non-transitory computer readable medium encoded with instructions for controlling a data processing system, in which the instructions when executed enable the execution of the steps of: forming by means of an application data to be transmitted; writing the data to a data buffer; using a first non-operating system functionality supporting a network interface device and a second non-operating-system functionality for performing protocol processing to cause the data to be transmitted over the network via the network interface device; and in response to the application being determined to be unresponsive, accessing by an operating system the data buffer and its corresponding connection state and requesting transmission of the data in said data buffer by means of a first helper process, said helper process being an operating system functionality executing at user-mode to cause the data to be transmitted over the network via the network interface device.

In another aspect a computer program product comprises computer executable code which when run is configured to provide any of the above methods.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described by way of example only with reference to the accompanying drawings, in which.

DETAILED DESCRIPTION OF THE DRAWINGS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
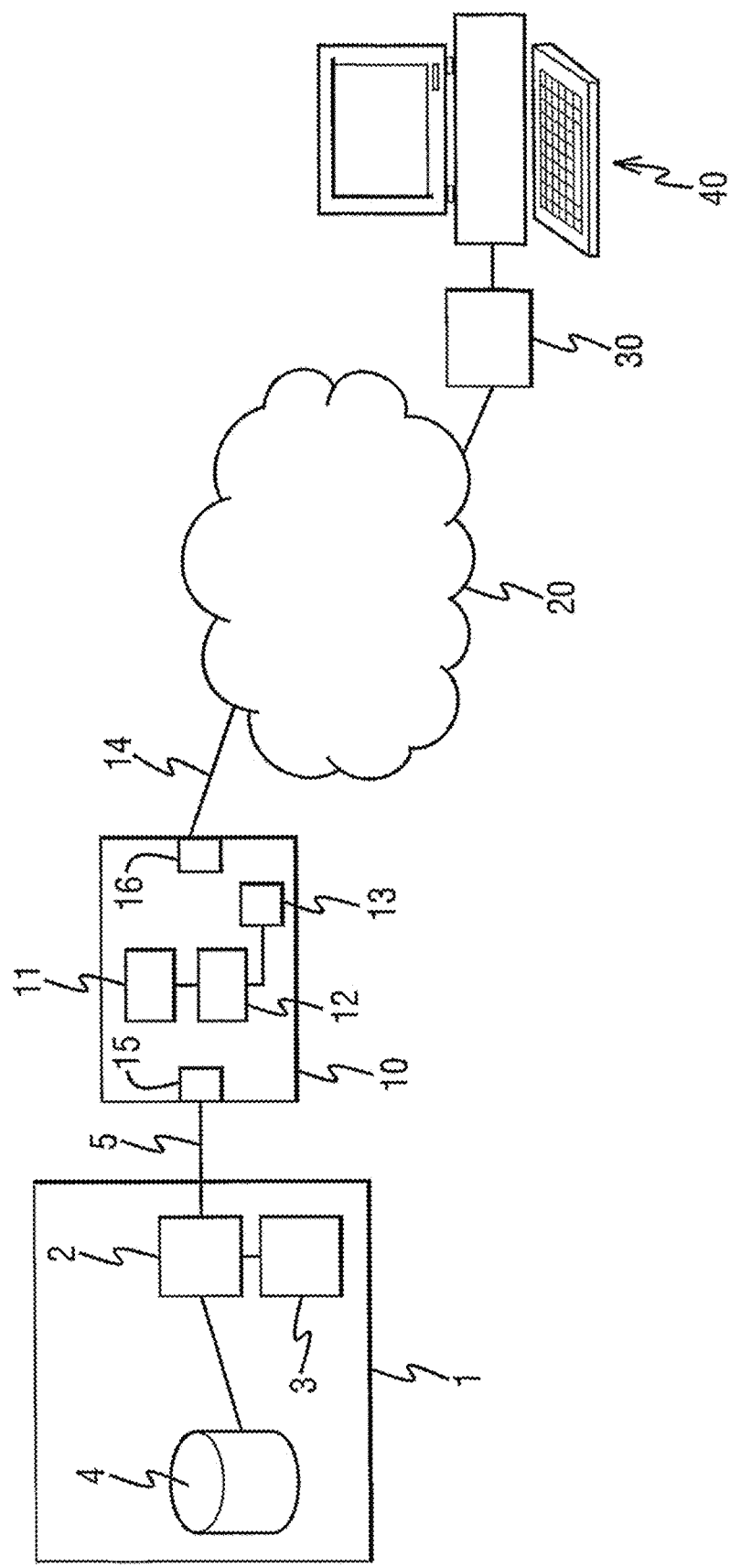
FIG. 1 is a schematic diagram of a network interface device in use.

FIG. 1 is a schematic diagram showing a network interface device such as a network interface controller (NIC) and the general architecture of the system in which it may be used. In some embodiments, there may be more than one NIC controller.

The network interface device 10 is connected via a data link 5 to a processing device such as computer 1, and via a data link 14 to a data network 20. Further network interface devices such as processing device 30 are also connected to the network, providing interfaces between the networks and further processing devices such as processing device 40.

It should be appreciated that the network interface device may be integrated in the processing device or separate from the processing device.

The computer 1 may, for example, be a personal computer, a server or a dedicated processing device such as a data logger or controller. In this example it comprises a processor 2, a program store 4 and a memory 3. The program store stores instructions defining an operating system and applications that can run on that operating system.

The network interface device may be capable of supporting standard transport protocols such as TCP (transmission control protocol, RDMA (remote direct memory access), UDP (user datagram protocol), SCTP (stream control transmission protocol), NVMEoF (nonvolatile memory Express over fabric) and ISCSI (internet small computer systems interface) at user level: i.e. in such a way that they can be made accessible to an application program running on computer 1. Such support enables data transfers which require use of standard protocols to be made without requiring data to always traverse the kernel stack. However all such protocols can be supported using the kernel stack.

Computer systems are generally multitasking, meaning they allow multiple different application programs to execute concurrently.

The computing device comprises an operating system which has a kernel. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process.

As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

Some embodiments may combine an Ethernet/IP based user-level network with an Ethernet based protocol stack supporting common protocols such as TCP/UDP/ARP/ICMP and supporting POSIX/1003 as implemented by the underlying operating system API. Some embodiments use a library designed to use operating system services, for example to receive IP route table updates or to reserve an IP port but is designed to exist outside of the operating system (or to bypass the operating system) by implementing a user-level network interface. The library may provide software that provides services to software applications beyond those available from the operating system. The library may be invoked before entering any system libraries, execution is at user-mode and is unprivileged and outside of the operating system.

Some operating system components can execute in userspace: these generally perform privileged operations and may commonly be called daemons.

Figure 2:
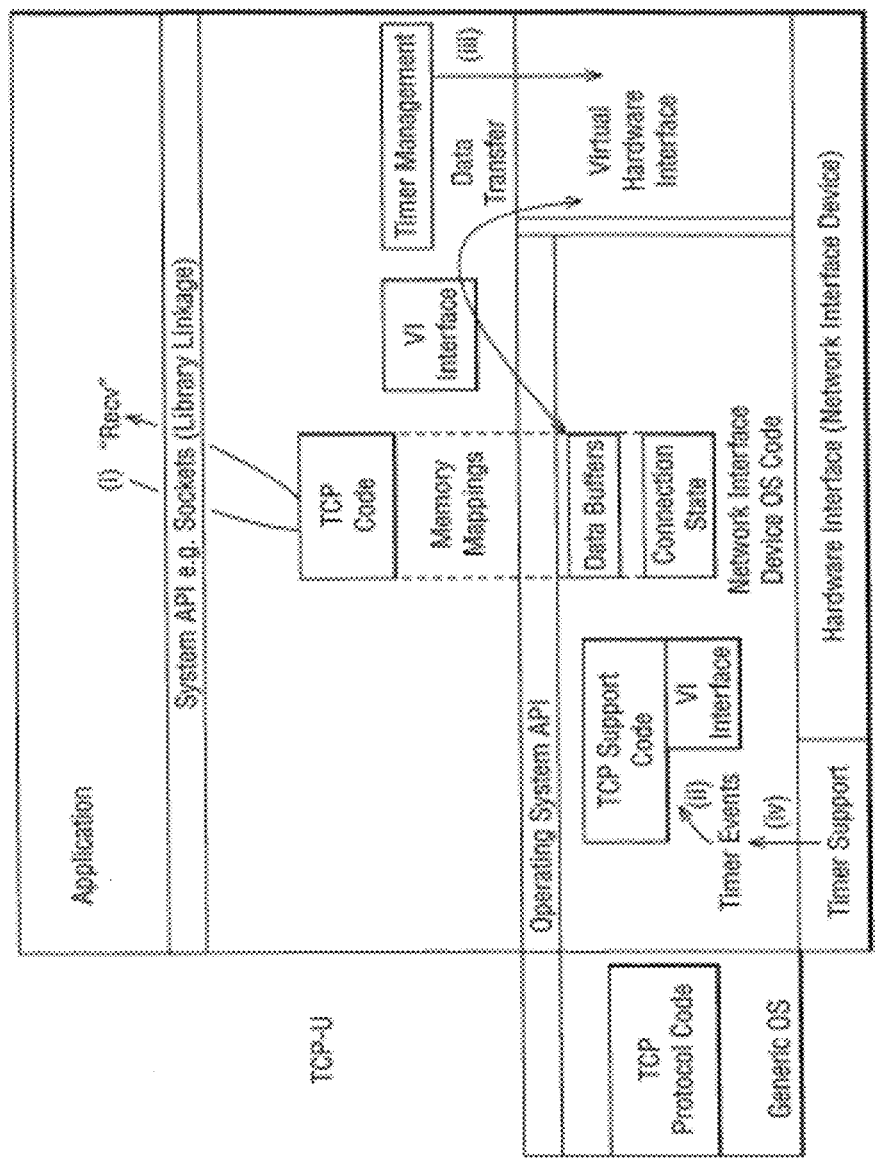
FIG. 2 shows an example of a TCP transport architecture.

FIG. 2 shows an example of a TCP transport architecture suitable for providing an interface between a network interface device such as device 10 of FIG. 1 and a computer such as computer 1 of FIG. 1. The architecture is not limited to this implementation.

Some embodiments provide a user level protocol processing stack. It is an implementation of TCP and/or UDP over IP or other protocols which is dynamically linked into an application's address space and granted direct access to accelerated network hardware. The network stack interposes network operations from the application and enables them to be handled completely at user-space. In so doing, it bypasses the operating system and may improves performance through the removal of disruptive events such as context switches and interrupts which otherwise reduce the efficiency by which a processor can execute application code.

The user level protocol processing stack dynamically links with an application at run-time and by implementing the standard BSD (Berkley software distribution) sockets API (also included in POSIX (portable operating system interface) standards such as 1003.12), enables an application to be accelerated without modification.

The user level protocol processing stack is a passive library, which means that no threading model is imposed on the application and that the library will work with any language binding. This property also means that the library can operate with low overheads, since protocol processing may take place directly in the context of the thread invoking the networking operation. On receive, the user level protocol processing stack library will generally operate lazily, in that protocol processing does not take place until a calling thread enters the library. This is known as lazy-receive processing and has benefits to performance, particularly improving processor cache spatial and temporal locality.

There are circumstances when asynchronous protocol processing should take place, for example, when an application thread is not provided for some significant period of time, or when an application exits before all its connections have been closed. For this reason, a user level protocol processing stack is a hybrid stack, capable of operating at user-space and kernel-mode for any given network flow and able to choose, dynamically, whichever is appropriate. Asynchronous operation is provided by the kernel—typically in response to an interrupt—and provides a robust mechanism to ensure that the user level protocol processing stack network stack responds to protocol events in a timely manner. A pure user-space implementation by contrast would not be able to make such guarantees, since otherwise once an application exits or crashes, all user-space protocol state is destroyed.

Hybrid stack operation is also beneficial for some workloads where there are many more application threads than physical CPU cores. Here the system must necessarily schedule between threads and it is often useful for some degree of background processing to take place in order that timely responses to synchronization operations such as poll( ) select( ) or epoll( ) may be made. The use of background processing in the kernel context often enables post-protocol processed results to be indicated to the user-space library with lower latency than would otherwise be possible. This feature is useful for protocols such as TCP where, for example, the semantics of TCP mean it is not sufficient to simply indicate that a packet has received in order to indicate that a file descriptor has data ready. Hybrid processing may also enable significant performance gains to be made for highly-threaded applications, especially if the application is bursty. It is often the case that once a thread is scheduled with a set of active sockets, a number of network operations can be performed in short order. These operations can take place completely in user-space during the time-slice available to the thread. This property remains true even if the stack had been previously operating in kernel mode for some or all of these sockets. The mechanism by which this hybrid operation is enabled is a protected memory mapping from the user-space library onto some of the protocol state associated with each socket. This protocol state canonically resides in the kernel and is accessed by the user-mode library component with low overhead via the memory mappings.

Reference is now made to FIG. 2 which describes user level protocol processing stack in more detail.

TCP code which performs protocol processing on behalf of a network connection is located both in the transport library, and in the OS kernel.

Connection state and data buffers are held in kernel memory and memory mapped into the transport library's address space. The operating system is the owner of those buffers, thus having full control over them, but they can be directly accessed by the application for whose communications they are to be used. This enables the application to transmit and receive data directly through those buffers and to read state data from the corresponding state buffer.

Both kernel and transport library code may access the virtual hardware interface for and on behalf of a particular network connection.

The virtual interface VI is the hardware provided by the NIC for communication and may comprise one or more of doorbell registers, RX/TX descriptor rings in host memory, an event notification mechanism in host memory, a timer which may cause an interrupt or an event to be placed on another VI which itself may interrupt.

Filters or other flow steering primitives may be implemented on the NIC which steer flows onto a given VI (replicating frames to multiple VIs and switching flows within the NIC where necessary). Code is provided (typically by the NIC vendor to program the VI. The VI code is designed to be operated in either the kernel or user context.

Timers may be managed through the virtual hardware interface, (these correspond to real timers on the network interface device) without requiring system calls to set and clear them. The NIC generates timer events which are received by the network interface device driver and passed up to the TCP support code for the device.

It should be noted that the TCP support code for the network interface device may be in addition to the generic OS TCP implementation. This is suitably able to co-exist with the stack of the network interface device. In the architecture of FIG. 2, buffers are allocated in memory on the data processor for use in cooperation with the NIC for the transmission and/or reception of data over the network. In the case of a transmit buffer, which is for use in transmitting data, the NIC is configured for reading data from that buffer and transmitting it over the network. The NIC may automatically read that data and transmit it, or it may be triggered to read the data by an application or the operating system running on the data processor. The trigger can conveniently be an interrupt. In the case of a receive buffer, which is for use in receiving data, the NIC is configured for writing to that buffer data received over the network. The data in the receive buffer may then be read by the application or the operating system and further processed by it.

The buffers are most conveniently owned by the operating system, in the sense that it has control over which entities have access to the buffers, it has allocated and/or created the buffers, and it is responsible for deleting them. However, both the application and the operating system can directly access the buffers for reading data from and writing data to them. The circumstances in which these steps occur will be described below.

In the case of transmission of data, the application will be expected to write data to a buffer for transmission and then trigger the NIC to read from the buffer to transmit that data. In some situations this alone may be sufficient to allow the data to be transmitted successfully over the network. However, the NIC does not perform protocol processing of transmitted or received data. Instead it is performed by the application or the operating system. Therefore if, for instance, the data is not received successfully by the intended recipient the application or the operating system processes acknowledgements, retransmission requests etc. (according to the protocol in use) and causes the NIC to perform retransmission. Normally this can be expected to be done by the application. When the NIC has data such as an acknowledgement message or a timeout for the application it writes that either to a receive buffer and/or an event queue. At the same time it starts a timer running. When the application accesses the data it stops and resets the timer. In that way the NIC knows that the application is responsive. However, if the timer reaches a predetermined value then the NIC determines that the application is unresponsive and signals the operating system, for example by means of an interrupt, to handle the data for the application. This has a number of advantages. First, the transmission of the data can be progressed by the operating system even if the application is busy or has been descheduled. Second, it gives the application the opportunity to intentionally ignore the data, for example by having itself descheduled, once it has placed it on the transmit queue, since the operating system will take over if necessary. The application controls the length of the timer, for example by setting its initial value. This allows the application to set the timer to suit its priority. The timer is preferably a hardware resource on the NIC to which the application has direct access.

Alternatively or additionally, the kernel may poll the stack from a periodic interrupt rather than a wakeup from the NIC.

In the case of reception of data, the NIC will receive the data and write it to a receive buffer. When doing so it will set a timer as described above, and preferably inform the application via an event queue. When the application access the data it resets the timer as described above. This again gives the NIC the possibility of determining when the application is unresponsive. Other means such as periodic scans of the data in the buffer by the NIC could be used for the same purpose. If the application is determined to be unresponsive then again the NIC signals the operating system to process the received data. In the case of received data the processing by either the application or the operating system will typically involve protocol processing (e.g. checking of packet sequence numbers, processing checksums, extracting traffic data and/or signaling the NIC to transmit an acknowledgement or retransmission request) and/or removal of data from the buffer for use, typically at user level.

Whilst the buffers are preferably allocated by the operating system, it is convenient for that to be done in response to a request from an application. Thus, if the received data might overflow the available receive buffers for an application, the application can request allocation of further buffers by the operating system. The NIC may signal the application by means of an event if this situation arises, based on pre-stored rules taking into account factors such as the amount of received buffer that remains free. Again it may set a timer when this signaling takes place, and if the application does not respond then the NIC can transmit a request to the operating system for a further receive buffer. The operating system can then allocate that buffer and inform the NIC of it, so that data can continue to be received for the application even if it is unresponsive. The effects of this architecture may be as follows.

(a) Requirement for Multiple Threads Active in the Transport Library:

This requirement is not present for the architecture of FIG. 2 since TCP code can either be executed in the transport library as a result of a system API call (e.g. recv( )) (see step i of FIG. 2) or by the kernel as a result of a timer event (see step ii of FIG. 2). In either case, the VI (virtual interface) can be managed and both code paths may access connection state or data buffers, whose protection and mutual exclusion may be managed by shared memory locks. As well as allowing the overheads of thread switching at the transport library level to be removed, this feature can prevent the requirement for applications to change their thread and signal-handling assumptions: for example in some situations it can be unacceptable to require a single threaded application to link with a multi-threaded library.

(b) Requirement to Issue System Calls for Timer Management:

This requirement is not present for the architecture of FIG. 2 because the network interface device can implement a number of timers which may be allocated to particular virtual interface instances: for example there may be one timer per active TCP transport library. These timers can be made programmable (see step iii of FIG. 2) through a memory mapped VI and result in events (see step iv of FIG. 2) being issued. Because timers can be set and cleared without a system call—without directly involving the operating system the overhead for timer management is greatly reduced.

(c) Correct Delivery of Packets to Multiple Transport Libraries:

The network interface device can contain or have access to content addressable memory or other hardware implementations of low steering including header processing engines and hash tables, which can match bits taken from the headers of incoming packets as a parallel hardware match operation. The results of the match can be taken to indicate the destination virtual interface which must be used for delivery, and the hardware can proceed to deliver the packet onto buffers which have been pushed on the VI.

(d) Handover of Connections Between Processes/Applications/Threads:

When a network connection is handed over the same system-wide resource handle can be passed between the applications. This could, for example, be a file descriptor. The architecture of the network interface device can attach all state associated with the network connection with that (e.g.) file descriptor and require the transport library to memory map on to this state. Following a handover of a network connection, the new application (whether as an application, thread or process)—even if it is executing within a different address space—is able to memory-map and continue to use the state. Further, by means of the same backing primitive as used between the kernel and transport library any number of applications are able to share use of a network connection with the same semantics as specified by standard system APIs.

(e) Completion of Transport Protocol Operations when the Transport Library is Stopped, Killed or Quit.

The "network interface controller" or network interface could be embodied as a physical card or it could be implemented in another way, for example as an integrated circuit that is incorporated in the data processing device. The network interface controller may be or comprise an ASIC (application specific integrated circuit), an FPGA (field programmable gate array) or any other suitable component.

The network interface device could be provided in any suitable form, including as a peripheral device or integrated with hardware of the host data processing device. The network interface device provides an interface to the network for use by its associated data processing device or the like. The NIC may logically be a component of a server.

In some embodiments, the NIC may be implemented by a hardware device. In other embodiments, the NIC may be implemented by a hardware device along with software in an operating system for example.

In some embodiments, the NIC may be a virtual NIC.

Figure 3:
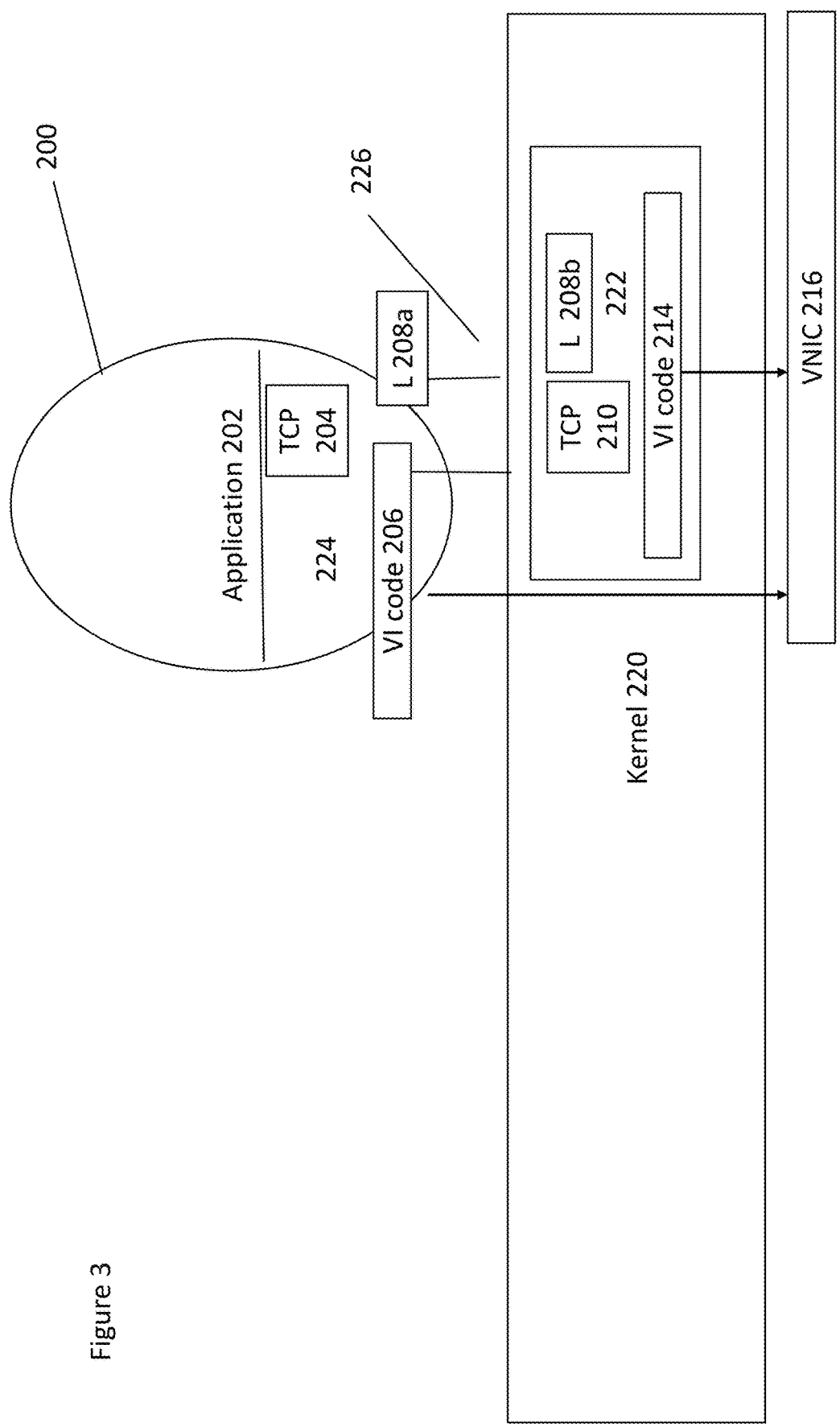
FIG. 3 schematically shows for the arrangement of FIG. 2 the management of shared state.

Reference is made to FIG. 3 to show how shared state is managed in the arrangement of FIG. 2. The user level process 200 runs an application 202 which is linked with a user level protocol processing library 224. The library may be dynamically linked. The user level protocol processing library 224 has the protocol processing stack 204 and code 206 to drive a virtual interface VI. Also provided is a lock 208a.

The kernel 220 has a kernel module 222 which supports the user level protocol processing. This kernel module 222 which supports user level protocol processing comprises a protocol processing stack 210, code 214 to drive a virtual interface VI and a lock 208b.

State is shared between the user level protocol processing library 224 at user level and the kernel module 222 at the kernel level. The shared state comprises information about buffers, TCP control blocks (TCB) and the lock and/or any other suitable information. This is schematically represented by lines which are referenced 226. State is allocated, freed and owned by the kernel module. Portions of the state are memory mapped to user space as required.

The lock is used to determine which of the protocol stacks is being used by enforcing mutual exclusion. For example, when protocol processing is being performed by the protocol processing stack 204 at user level, the user level will have the lock 208*a* which prevents the protocol processing stack in the kernel from being used. When the user level protocol processing stack 204 is being used, the virtual interface code 206 at user level is used. The virtual interface code 206 at user level provides an interface to the VI of the NIC 216. The NIC may be a virtual NIC in some embodiments. Likewise when protocol processing is being performed by the protocol processing stack 210 in the kernel, the kernel will have the lock 208*b* which prevents the protocol processing stack in the user level from being used. The lock is schematically represented by blocks 208*a* and 208*b* but in practice these blocks are the same lock. When the kernel protocol processing stack 210 is being used, the virtual interface code 214 in the kernel is used. The virtual interface 214 in the kernel provides an interface to the VI of the NIC 216.

The kernel module 222 can override the lock in the case that it decides that the application is not behaving correctly. For example, in order to ensure stability, memory mappings can be removed and/or the entire application may be terminated before breaking the lock In some embodiments, a NIC may be used which specifically supports this user level protocol processing stack library described in FIG. 2. Typically such a NIC may be provided with software and/or hardware in order to support the described functionality, for example the timer features. Such a NIC is thus provided with specific user level protocol processing stack supporting software. However in some embodiments, it is desirable to be able to support user level protocol processing stack functionality with one or more general NICs, for example in a DPDK environment.

It is desirable to achieve the above described functionality in the context of a DPDK product or library. In particular some embodiments may allow the use of a user level TCP/IP stack over a DPDK API to access the NIC VI rather than by accessing a NIC VI through user level VI code. The DPDK API is used for the transmission and reception of network frames.

DPDK is defined at the user level but user level protocol processing stack library requires from time to time the ability to cause the kernel module to step in as discussed previously. The arrangement of FIGS. 2 and 3 has the kernel module stepping in, if for example the application is unresponsive. The kernel module will then deal with the transmission and reception of frames. The arrangement of FIGS. 2 and 3 also uses functionality on the NIC, for example the timer function, to cause the kernel to step in.

It is desirable in some embodiments to achieve a similar effect where the kernel needs to step in but still using the DPDK interface to receive and transmit frames. It may be desirable to do this without requiring a NIC to generate an interrupt to the kernel to cause the kernel module to step in.

The use of DPDK in this context may provide one or more challenges which some embodiments may at least address. As mentioned previously, the transport protocol processing may generally be performed at the user level. However there may be one or more scenarios where the kernel component may need to step in. For example the application may be descheduled and the kernel may need to deal with retransmissions. However there is no path for data between the kernel and the NIC using the DPDK model. Communication is between the NIC and the DPDK functionality only for user space code.

Figure 4:
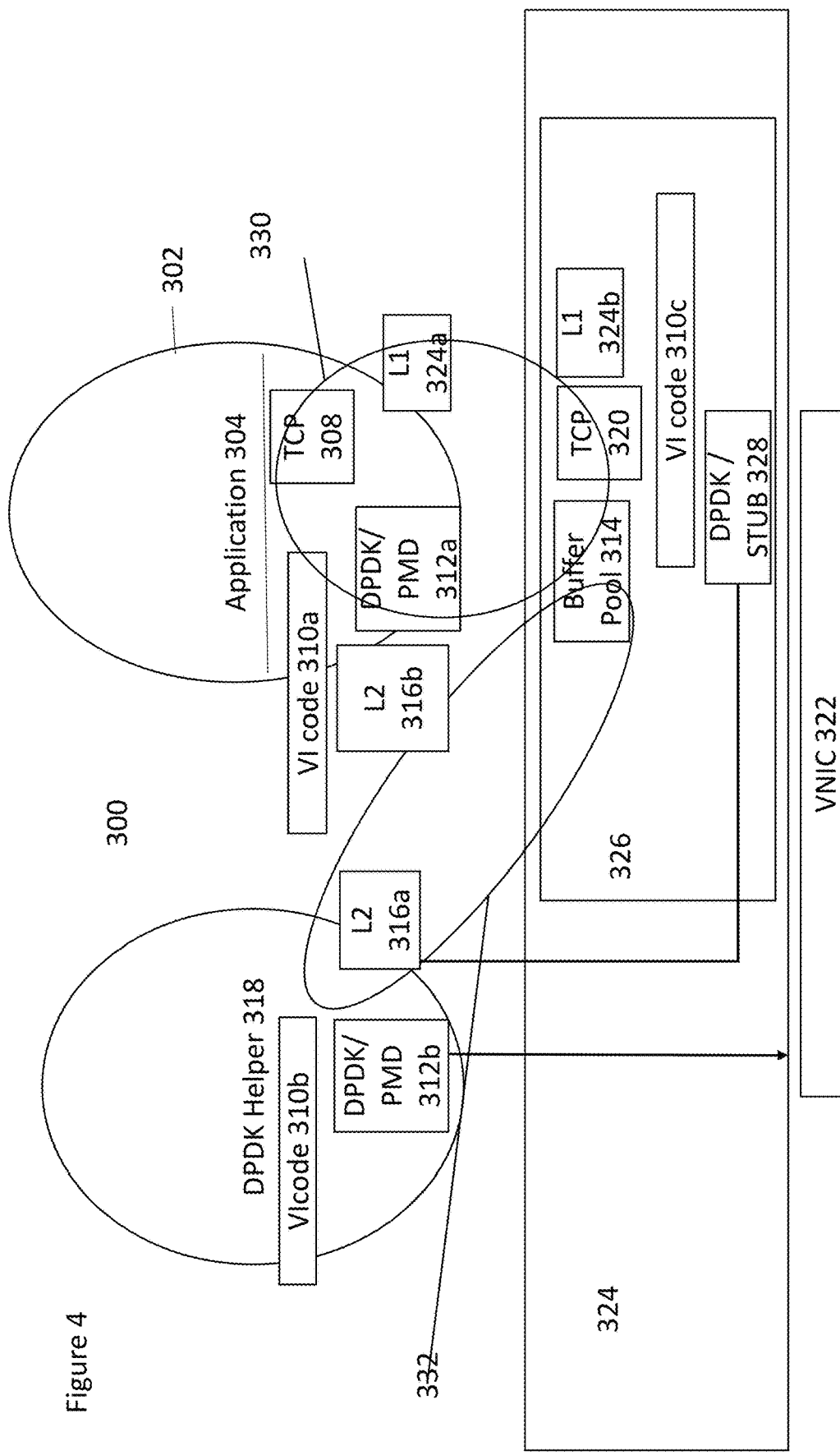
FIG. 4 shows a modification to the arrangement of FIGS. 2 and 3, using DPDK.

Reference is made to FIG. 4 which schematically shows such an embodiment. As will be described in more detail a helper process 318, at the user level 300, is run. The helper process is a daemon which is started when the application is started or when the kernel module is initialised.

In the user level 300, a process 302 is supported. The process 302 comprises an application 304 and a user level protocol processing stack 308.

A VI code 310*a* is also provided in the process 302. This is the VI interface as described in relation to FIGS. 2 and 3 and allows NICs such as described in the context of FIGS. 2 and 3 to be supported. A VI interface code 310*b* is also provided in the helper process 318.

A DPDK PMD (poll mode driver) is also provided to support any NIC without the software functionality described in the context of FIG. 2. The PMD is provided in the process 302 and this is referenced 312*a* as well as in the helper process 318 and this is referenced 312*b*. In particular, DPDK may comprise a Poll Mode Driver (PMD) which has APIs, provided through a library 330 running in user space, to configure the devices and their respective queues. These devices may comprise one or more NICs. In addition, a PMD accesses receive RX and transmit TX descriptors directly without any interrupts (with the exception of link status change interrupts) to receive, process and deliver packets in the user's application or flow steering primitives In the kernel space 324, there is provided a kernel module 326 to support user level protocol processing. This kernel module 326 comprises a protocol processing stack 320.

VI code 310*c* is provided in the kernel module 326 for interfacing with a NIC such as described in relation to FIGS. 2 and 3. For illustrative purposes a virtual NIC 322 is provided which is supported by DPDK. The virtual NIC may be implemented as a VI or as a PCIe (peripheral component interconnect express), physical function (PF) or Virtual Function (VF) or any other means. In some embodiment, a second or alternative NIC may be provided which is as described in relation to FIGS. 2 and 3. In some embodiments, there may only be one NIC of either type. In some embodiments, there may be two or more NICs which may be of the same type or of differing types.

The kernel module 326 comprises a DPDK stub 328.

Also provided is a shared memory pool and buffer pointers 314. This is provided in a memory area which is shared between the kernel and the user space.

A first lock 324*a* and 324*b* is provided. The lock is provided in shared memory. This is the lock described previously in relation to FIGS. 2 and 3. The two blocks are provided for illustrative purposes with block 324*a* representing locking by the user level protocol stack and block 324*b* representing locking by the protocol stack of the user level protocol processing support part.

A second lock 316 may optionally be provided. The lock is between the application process and the helper thread to control which process polls the PMD 312. This lock can be held by the process 302 as represented by block 316*b* or by the helper process as represented by block 316*a*. The lock is held by the process which is polling the PMD.

The second lock may be implemented by the kernel so that it will survive the crashing of an application.

In some embodiments, it may be possible to implement the helper as a thread and use an inter-thread lock primitive instead.

Shared state between the user protocol processing stack library and the kernel module comprises the TCB, buffer information, the first lock 324 and the second lock 316, if provided. Shared state between the DPDK helper 318 and the kernel module comprises the second lock 316 and information about the buffers.

In some embodiments the user level protocol processing stack functionality is provided over DPDK that uses a ghost (also termed stub) VI feature to allow embodiments to operate without real underlying hardware and a set of DPDK PMD queues (a receive queue and a transmit queue) to be paired with each user level protocol processing stack VI. In some embodiments, a thread that copies packets and descriptors between user level protocol processing stack VI queues and the corresponding DPDK queues may be provided. In other embodiments, a mechanism which avoids the need for copying may be provided. This would for example move pointers or references to buffers rather than the contents of the buffers themselves.

In some embodiments, the user level protocol processing stack is configured to link to the DPDK libraries. On initialization of the user level protocol processing stack library, a DPDK KNI (kernel NIC Interface) (similar to tap) device is created. A KNI allows user level applications to access the kernel network stack. The KNI device allows the control paths associated with a respective NIC to be set up.

The kernel module control plane and resource driver is configured to recognize the KNI device as acceleratable. There is stub access to MCDI (management controller driver interface) using the existing flags (similar to the way in which an unplugged or reset NIC is dealt with). Separate threads are used to transfer traffic between DPDK queues, KNI and the user level protocol processing stack VI, and vice versa.

The helper process will now be described in more detail. The helper process is responsible for calling control plane functions which cannot be executed by the kernel module, including: DPDK resource allocation and configuration, registering DPDK resources with a RM (resource manager)/control plane, enabling shared use of PMDs with user level protocol processing stack application processes and performing data plane functions on behalf of the kernel module where such functions cannot be executed by the kernel module, such as: aiding keep up of user level protocol processing stacks when no application is doing this. With the user level protocol processing stack system described in the context of FIG. 2 and, for example where user level protocol processing stack is on the VI, control plane functions are normally the responsibility of RM/HW (hardware)/Driver Link working with a TCP component of the user level protocol processing stack and data plane functions can be directly executed in kernel mode The helper process may be implemented as much as possible in the user space, rather than kernel space. The helper process may be implemented as much as possible in the VI etc., rather than in the user level protocol processing stack. The helper process itself does not perform protocol processing. Protocol processing can only be performed by one of the protocol processing stacks. The helper process may thus have not access to protocol state other than the buffers. For example, the helper process does not have access to the TCB.

The helper process may be the first part of the system to be started. It may run as a root or the like. On start-up, the helper process may read and apply its configuration, initialise DPDK, detect network devices, and create DPDK memory pools and queues. It may also create one kernel-level TAP/KNI device for each detected/configured DPDK device (PMD and port). This KNI device will be used to pass traffic such as ARP (address resolution protocol) to the kernel. It also offers the user application a place to apply configuration (such as assigning it a MAC address, or creating a VLAN (virtual local area network) device on top of it). In this way, starting the helper is similar to loading a kernel module in that it makes the DPDK network devices "appear" to the rest of the system.

The kernel modules may will auto detect NICs which support user level protocol processing stack.

An ioctl is added to a control plane of the kernel module 326, ioctl (input/output control) is a system call for device-specific input/output operations and other operations which cannot be expressed by regular system calls. It takes a parameter specifying a request code; the effect of a call depends on the request code. This tells the resource manager to register the given network device as being able to be used with the user level protocol processing stack. This network device will be assigned a hardware type, In some embodiments, a corresponding ioctl for deletion may be provided.

For robust and race-free teardown, in some embodiments, registration is removed when the associated TAP/KNI device is deleted.

When the helper process starts, it will need to decide how the DPDK PMDs and port numbers will be mapped onto pseudo-VIs.

Having generated this mapping, the helper will need to initialise a shared memory region 314 which will communicate the details to the individual stacks. In some embodiments, there may be a shared memory region per application. In other embodiments, it may be that different applications need to share buffers. Each pseudo-VI 310 needs a reference to the associated PMD and memory pool, references to the RX and TX rings used to communicate with it, and a reference to the second lock to synchronise activity with the helper process.

The helper process also starts to poll DPDK queues and pass descriptors to/from the TAP/KNI device in the kernel. This makes system-level protocols such as DHCP (dynamic host configuration protocol), ping, etc. usable before any user level protocol processing stack stacks have been created.

Finally a user level protocol processing stack enabled process starts and creates a stack. It binds to the pre-existing queues and memory pools created by the helper.

In some embodiments, access to queues, pools, etc. is shared between the application process and helper process.

In some embodiments, the helper may have no access to stack state other than packet buffers.

Depending on the NIC, the helper process can determine whether PMD has "interrupted" within the kernel, avoiding the need to go up to the user space except in order to perform transmit and receive operations The kernel module is effectively is "calling" or "requesting" the helper process. As the ioctl (or similar) mechanism, such a call is implemented as a return from a previous ioctl call which had blocked and a return is implemented as a call from the helper process. This is also known as an "up call".

Arguments for the helper process call are encoded in the ioctl return values and the arguments for the helper process return are encoded in the next ioctl call arguments. Thus the kernel makes an "up-call to user-space". The helper process is an extension of the kernel module to be used when the kernel module needs to be in user-space.

The system is still being "driven" by the kernel component as previously discussed in relation to FIGS. 2 and 3. In this way, the same arrangement as shown in FIGS. 2 and 3 can be supported (without changing the way in which the relevant interfaces operate) as well as DPDK hardware.

With specific user level protocol processing stack supporting NICs (of the type discussed in relation to FIG. 2 and) and VI, the issue of mapping NIC functions to user level protocol processing stacks may be straightforward. This may be due to such a NIC's general purpose queues and availability of variety of specific filter types. Each such NIC function has a large array of queues, and each queue on a given function can share the same MAC address due to more specialized filters and with that they can all map to single OS network interface.

With respect to RSS (receive side scaling), it can use any contiguous array of VIs the function has available. It is possible to configure multiple RSS arrays on a single function mixed with no-RSS queues.

With DPDK little of the above may be assumed. MAC filters might have hardware dependent limitations: e.g. only single MAC filter can be available per function. On some general NICs a function can have a MAC filter per queue, however the limit of functions can be low. RSS requires dedication of entire function, and often this would need to be PF packet filtered.

Another consideration is system configuration. Topology of functions may be beyond what can be discovered by DPDK APIs. They can be configured externally to fulfil a special purpose: take on subset of traffic from other function (e.g. TCP only, a destination port, port range or the like). The specific set-up might use NIC specific filters, or functionality (e.g. queue can be set to handle tunnelled traffic) or configured by hyper-visors or OvS (Open vSwitch) in an arbitrary way. Note that restrictions may be imposed by administrators of infrastructure (cloud or data centre) on various tiers. This may require a user to provide some configuration so relations between functions and their purpose are defined. Detailed configuration may not need to always be passed, as common use cases may be pre-set. For example there may be a pre-set called Nginx-i40e. In some embodiments a detailed configuration can help use proprietary hardware features and achieve a desired performance.

Each user level protocol processing stack relates to a number of HW ports, where a HW port corresponds to a NIC function on one side and to OS network interface on the other. The HW port is coupled with OS interface(s) through a control plane, which understanding OS network management (routes) indicates which HW port to send outgoing traffic with. A HW port within a user level protocol processing stack may map directly to a VI queue.

In some embodiments, there is a simple 1:1 HW port to function mapping in DPDK. However, there may be some use cases where having this direct mapping might be not be appropriate. Some NICs may only support one function to one queue mapping, and with a single HW port per function approach, that could mean in certain use cases a lot of HW ports, and in turn it could mean a lot of KNI/TAP devices.

Traffic with the same MAC VLAN address might get spread on multiple functions or queues on a NIC, vSwitch, switch or virtualisation layer. When this is the case these functions may be mapped to single HW port to ensure that the control plane can point outgoing traffic to the same HW port and queue from which it came.

With MAC VLAN network interface aliases it may be possible for single HW port to handle multiple MAC addresses. With HW filter support limited to MAC VLAN filters and HW port and NIC function 1:1 mapping, this allows multiple user level protocol processing stack stacks to be supported off a single function.

Some embodiments may allocate PMD queues to stacks. As described above a single NIC function might relate to a single queue; an array of queues capable of using different MAC addresses; or array of RSS channels serving a single MAC address. Alternatively or additionally some functions or queues can serve a specialized purpose.

Some embodiments may provide an association of specific functions/queues with specific user level protocol processing stack stacks. For example for an Nginx app running on i40e NIC one or more of the following configurations may be used.

1. Static server:
    master process obtains a stack with no hardware
    An Nginx worker gets a stack with a PMD queue from a specific packet filter for RSS:passive-active
2. For zero-copy proxy, where RSS active-open is supported:
    master process obtains a stack with no hardware
    Each Nginx worker gets: a stack with a PMD queue from downstream NIC's packet filter for RSS:passive, and a queue of upstream NIC's packet filter RSS for upstream active-open.
3. For proxy, where RSS active-open cannot be supported:
    master process obtains a stack with no hardware
    Each Nginx worker gets: one stack with a PMD queue from specific NIC's packet filter for downstream RSS:passive; another stack for upstream active-open based on virtual filters with a different MAC address each.

It should be appreciated that more than one application can be run, with the same or different configurations.

In some embodiments, the PMD queues are fixed to stack mapping upfront based on a pre-set or configuration provided by the user on helper process launch. When a stack is created and then recreated it would get the same set of resources, each stack would may be unique and may be inferred when the application creates one. This may be appropriate for more rigid use-cases such as Nginx.

Alternatively, resources may be allocated to stacks on demand. The running of logic to pick hardware for stack may be deferred until the stack is being created.

DPDK HW layer is a hardware adaptation layer integrating DPDK PMD with user level protocol processing stack stacks through pseudo VIs and stack polling. The state of this layer is managed by the helper process. Some operations such as access to DPDK devices and memory pools may only be performed in user context and to support this a pseudo VI (pVI) or the like is provided to allow stack processing run in kernel without major code changes.

VI code is the software code used to access a VI. The VI is normally implemented in hardware except when there is no hardware as in this case. The pVI is the software implementation of the VI.

This layer may operate on PMD queues, pseudo VIs, packet buffer headers (owned by it) and memory buffers.

As discussed previously in relation to FIGS. 2 and 3, in the user level protocol processing stack, the kernel operates as a TCP helper to the user-space application ensuring that the protocol stack gets serviced when the application is not itself calling into user level protocol processing stack either because it has blocked, is not scheduled, or is busy doing other work of its own. This is done via a combination of wakeup events (effectively interrupts from the NIC when there are packets waiting), periodic timers, and work queues. However, DPDK does not allow direct access to its API from the kernel.

The helper process may have two types of threads—a global monitoring thread and a helper thread. The global monitoring thread may emulate timer event generation and/or interrupts. The per-stack helper threads (or, alternatively application), each poll their stack when woken up in response to a determination by the monitoring thread. The monitoring thread does not need to communicate directly with the per-stack threads. The monitoring and helper threads can be regarded as separate subroutines called by the kernel module. If the monitoring thread returns that a particular PMD has attention then this might later cause the kernel module to take the stack lock and perform a TX/RX operation on the VI which would cause a kernel call to the DPDK helper Depending on the up call semantics, for example whether a helper is requested to busy poll the DPDK PMD or else to make a single poll, the kernel module may optionally drop the stack lock during the up call and require that the helper and application enforce exclusion between each other before invoking DPDK API calls through the optional lock L2 (316).

The monitoring thread may do one or more of the following:
  emulate timers for all the stacks by monitoring per-stack registers updated on each stack poll;
  poll unserviced PMD receive queues for presence of data, as well as pseudo stacks' VIs' TXQs (transmit queues);
  wake up a helper thread when there is a timeout and data present; and
  perform its work generally in kernel space where it can sleep/wake up processes with minimal overhead.

The helper thread may do one or more of the following:
  operates mostly in kernel context (using ioctl) to avoid having the stack mapped into process space and keeping user space references to it;
  possibly takes kernel reference rather than lock as it only performs read only checks;
  mostly sleeps until woken by monitoring thread when there is a need;
  services PMDs' RXQ (receive queue);
  polls the user level protocol processing stack;
  services PMDs' TXQ (with pseudo VI's TXQ descriptors);
  is affinitized to core to ensure stack locality.

Thus a scheduler may be requested to run the helper thread on a core which shares a cache with the helper thread. This is done so that any operations which cause cache lines to be loaded with the contents of a buffer are available to the application thread(s) when it processes the data.

The above may ensure the helper process is lightweight (no user level protocol processing stack mappings), easy to context switch and could operate on a core which is running non-performance critical threads (e.g. CPU0).

Helper processes are stateless and can be stopped/started or crash without causing any state to be lost. A helper process may be restarted without requiring any TCP connection be re-established.

Figure 5:
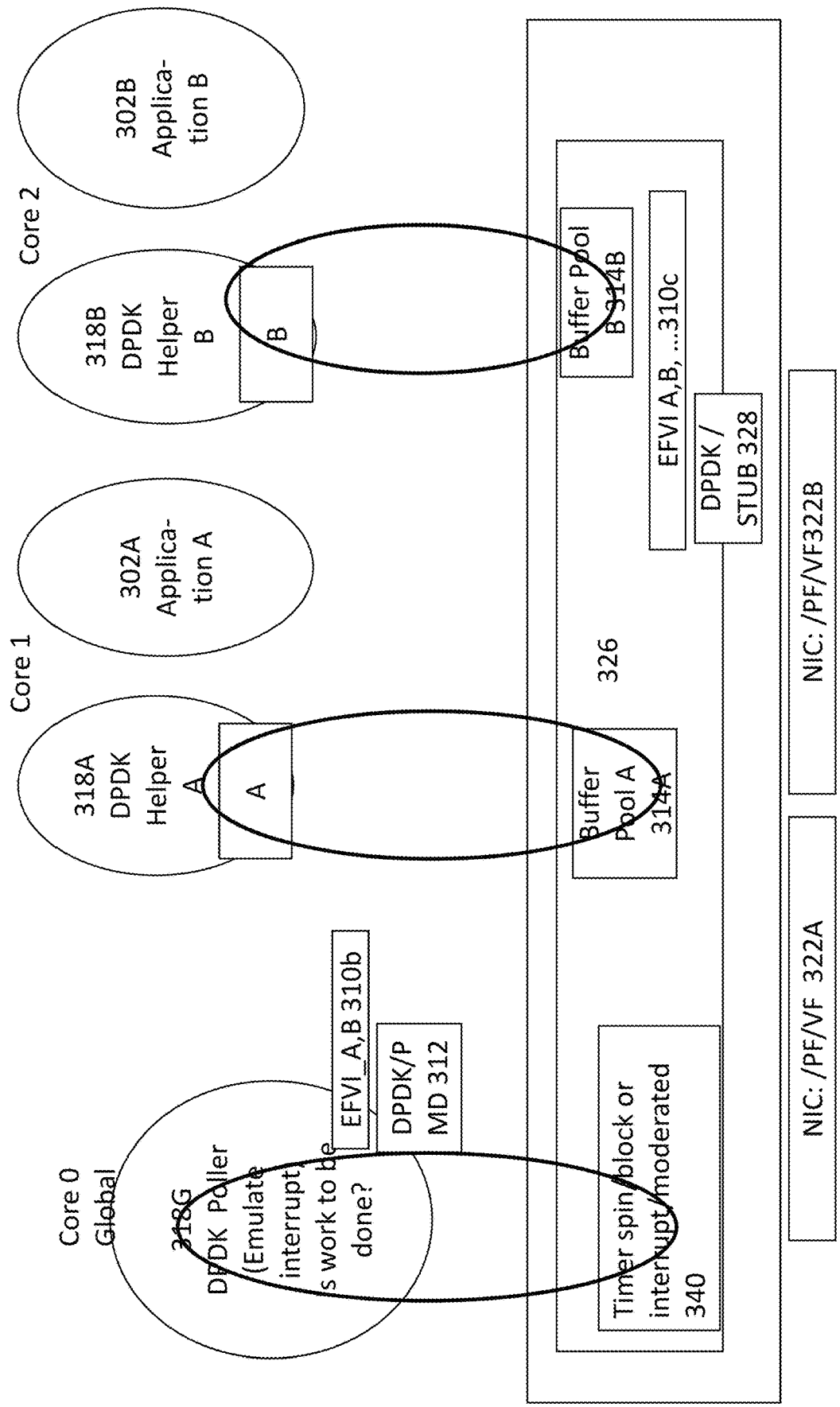
FIG. 5 shows schematically the instances of the helper process shown in the arrangement of FIG. 4.
Figure 6:
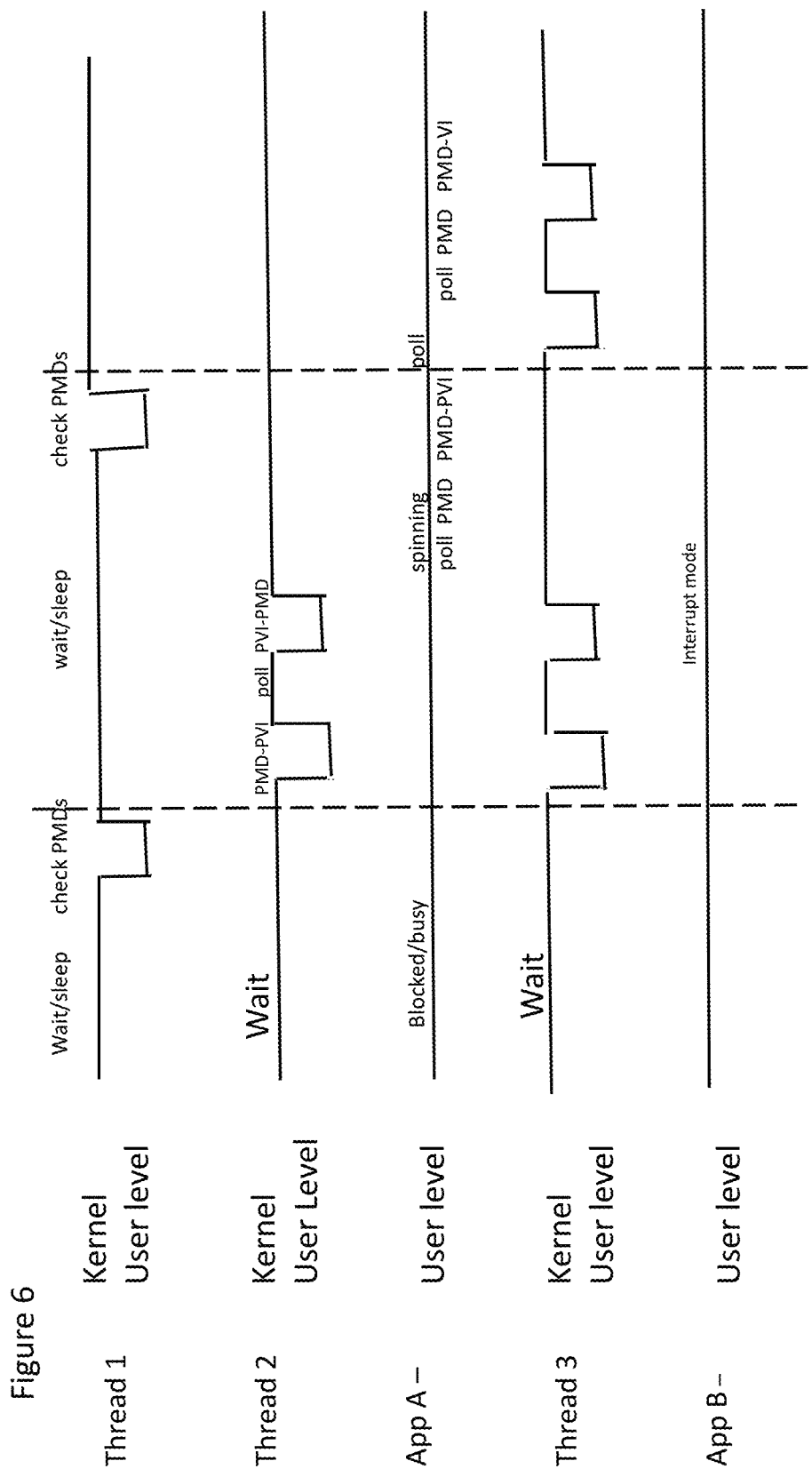
FIG. 6 shows a timing diagram for threads of the different instances of the helper process shown in FIG. 5.

Reference is made to 5 and 6 which shows the actions of the threads in the kernel and user level. FIG. 5 schematically shows the functional blocks for different threads in the arrangement of FIG. 4 and FIG. 6 shows a timing diagram associated with the threads and the applications. In the example of FIGS. 5 and 6, two applications are supported. This is by way of example only and more or less than two applications may be supported.

As shown in FIG. 5, the helper process is provided on a plurality of different cores. The helper process 318G which provides the global monitoring process is provided on a core different to those which support applications. This is to avoid contention for CPU resources between an application and the helper process providing the global monitoring process. However it should be appreciated that in some embodiments, the helper process 318G may be provided on the same core as one which supports an application.

Each core which supports an application is also provided with a respective helper process which provides the respective helper thread for that application. In the example shown in FIG. 5, there are two application processes A and B, referenced 302A and 302B. Each of these applications would be as described in relation to FIG. 4. Application process 302A is provided on CPU core 1 along with its helper process referenced 318A. Application process 302B is provided on CPU core 2 along with its helper process referenced 318B. It should be appreciated that embodiments may be used with N applications, where N is an integer, greater than or equal to one.

Each application has its own buffer pool, referenced 314A for application A and 314B for application B. This is because the particular NIC is able to bifurcate traffic as required using flow-steering or filters.

The kernel module 336 in the kernel comprises a timer functionality 340 which is used to check if there is data which needs to be serviced by the protocol stack in the kernel and which can generate interrupts. This timer functionality 340 interacts with the helper process 318G.

Reference is made to FIG. 6. The first row shows the interrupt helper or global monitoring thread (first thread) provided by the helper process G on the core 0.

The second row shows a helper thread (second thread) for the first application, application A, on core 1 and the third row shows the action of the first application.

The fourth row shows a helper thread (third thread) for the second application, application B, on core 2 and the fifth row shows the action of the second application.

Initially the first, second and third threads are in a wait or sleep state in the kernel. The first application is busy or blocked and the second application is an interrupt mode.

The first thread will then check the PMDs. The first thread may be arranged to regularly check the PMDs. The kernel thus schedules the helper to poll on its behalf. In the case where packets are found as a result of the polling, the respective interrupt helper for applications A and B on the respective cores are woken up. In this example, the interrupt helpers on both the first and second cores are awoken. The first thread then reverts to a wait or sleep state in the kernel.

The waking of the helper for the first application causes the second thread to move descriptors from PMD to pVI at the user level. These descriptors are reference to a RX or TX buffer. This causes polling via the pVI at the user level of the protocol processing stack at the kernel level. The protocol stack is thus only polled by the kernel module or by the application itself. This is to determine the protocol processing state and location of any data to be transmitted. Next the second thread will move the descriptors defining the location of the data in the memory pools to be transmitted from the pVI to the PMD at the user level.

Kernel polling the stack could cause sockets to be indicated as ready—allowing for future calls to read or epoll( ) to return quickly.

Kernel polling the stack could cause an ACK (acknowledgement) to be transmitted via the DPDK helper.

In some embodiments, frames or data are received by the helper. The kernel module performs TCP processing and as a result a call to epoll_wait( ) might complete to indicate that a set of sockets are ready.

Kernel polling the stack could cause a retransmission to be performed (via the DPDK helper). The helper may enact the program registers to institute the DMA to cause retransmission.

After this the thread reverts to a wait state at the kernel level, waiting to be awoken by the first thread. The first application will be polling the PMD, moving descriptors from the PMD to the PVI, polling at the user level, and moving descriptors from the PVI to the PMD. This steps may be repeated as required.

The waking of the helper for the second application causes the third thread to move descriptors from PMD to pVI at the user level. This causes polling of the user level protocol processing stack at the kernel level. Next the third thread will move the descriptors from the pVI to the PMD at the user level. After this the thread reverts to a wait state at the kernel level, waiting to be awoken by the first thread. In this example, the interrupt helper will wake up the third thread but not the second thread after the occurrence of the next check by the first thread of the PMDs.

In embodiments, the helper is stateless. When it is determined that for example a retransmission is required, the helper will enact a DMA (direct memory access) at the user level.

The limited amount of work done in some embodiments by the monitoring thread may mean that this technique scales well for a plurality of stacks and would not require a thread per NUMA (non-uniform memory access).

This helper process may work well with devices supporting RX interrupts (with which there would be no user space work required by the monitoring thread. For such devices the kernel would not up call or activate the monitoring thread.).

As mentioned previously, it should be appreciated that the second lock may be omitted in some embodiments. The first lock may be sufficient to prevent the application from accessing the VI code when the kernel module is also accessing the VI code and the helper thread is not spinning. Rather the helper thread only handles TX/RX when requested to do so by the kernel (by returning from the ioct with this request), However the second lock may be useful if the system was such that the helper could be told to while the kernel had dropped the first lock.

For the global monitoring thread—because this is not doing any work which modifies state—it only needs to inform the kernel that there is something to do, no access to a lock is necessary in some embodiments. However if DPDK/PMD were to be modified such that state may be modified, the second lock could be used for this purpose.

It should be appreciated that in some embodiments the functionality required to support a NIC such as discussed in relation to FIGS. 2 and 3 may be kept decoupled from DPDK.

One option is to have separate user level protocol processing stack packet buffers and DPDK memory buffer pools. This results in a copy between them. Other embodiments may a pool of buffers shared by the user level protocol processing stack and DPDK to avoid this requirement for copying.

DPDK has a recommended minimum memory size which may be greater than user level protocol processing stack buffers which may be 2 KB buffers. The user level protocol processing stack may use part of the packet buffer to store its metadata while DPDK layers do not provide a convenient facility for this.

Figure 7:
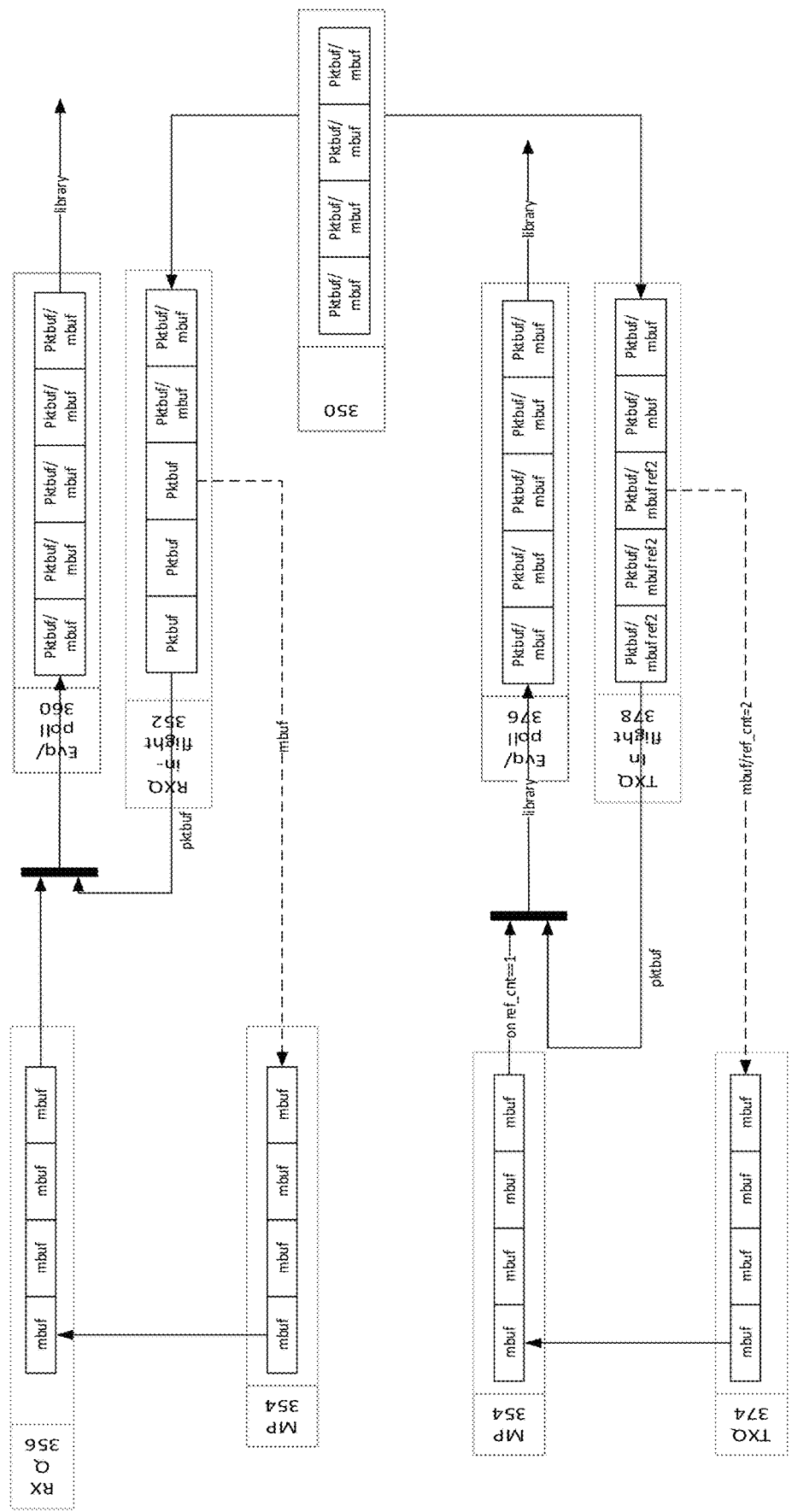
FIG. 7 shows a first example of usage of a shared memory in some embodiments.

Reference is made to FIG. 7 in the following.

In one embodiment DPDK allocates the memory needed for the memory buffers mbuf and these would be treated by user level protocol processing stack as just memory containing Ethernet frames. When these Ethernet frames are passed into user level protocol processing stack on stack initialization, a matching number of packet header objects pktbuf that would contain only the packet metadata is allocated, and chain a memory buffer onto each one. When a packet buffer is owned by user level protocol processing stack, it is a complete pair of packet header objects with the associated memory buffer. The association may only be broken when the packet buffer is owned by the DPDK HW layer or any external library which is not able to maintain external metadata alongside its own internal abstraction of a data-buffer.

The receive method may be as follows, the associated queues and memory pool being schematically shown in the upper part of FIG. 7:

1. User level protocol processing stack packet buffer free pool 350 contains packet headers paired with memory buffers.
2. Fill the user level protocol processing stack receive queue 352 with packet headers paired with memory buffers. The buffers are 'inflight' and ownership is passed to DPDK HW layer.
3. DPDK HW layer processing:
   1. Free memory buffers 354 to memory pool associated with a PMD RXQ 356 (for example a PMD RXQ specific memory pool). PMD 312 will suck them up when needed.
   2. When popping a memory buffer off of the DPDK RXQ, attach it to the next buffer in the user level protocol processing stack RXQ and write an RX event to the user level protocol processing stack event queue EVQ 360.
4. When the user level protocol processing stack EVQ 360 is polled, the packet header is queued in the appropriate socket.
5. When the socket is finished with it, the packet header and memory buffer goes back to user level protocol processing stack free pool.

The transmit method may be as follows, the associated queues and memory pool being schematically shown in the lower part of FIG. 7.

1. Acquire a packet buffer from user level processing stack free pool 350—it is guaranteed to be the header associated with the memory buffer.
2. Post the packet header, associated with its memory buffer, to the user level protocol processing stack TXQ 378, passing ownership to DPDK HW layer.
3. DPDK HW layer processing:
   1. Tell DPDK to send the memory buffer having increased memory buffer reference count (from 1 to 2). This will prevent the memory buffer from being freed to the memory pool 354 (user level protocol processing stack requires packet header holds on to the memory buffer) and once PMD is finished with it the reference count will drop to 1. The transmit queue on the DPDK helper side is referenced 374.

2. Optionally wait until the reference count drops (packet has been transmitted) before signalling the event queue 376 on TX completion
3. Write a TX complete event to the emulated user level protocol processing stack event queue 376.
4. User level protocol processing stack handles the emulated TX completion, and
5. When eventually no longer needed, the packet header with its memory buffer gets moved to the free pool for reuse.

Inline DPDK processing may combine one or more of the above steps.

The above approach may be extended to cover Open vSwitch and virtual ring based applications in general.

The following one or more considerations may be taken into account:
1. Memory buffers appearing on a single receive ring might be coming from different pools and might not be suitable for reusing (receive or modified for different transmit).
2. Buffers going to OvS TX have some components preserved: header, packet payload, but not metadata.
3. Packet going to OvS TX might need some preformatting.
4. OvS have a named memory pool, whose memory buffers could be allocated by the user level protocol processing stack.
5. Packet gone to OvS TX might spend there long time, be freed out of order, and in total exceed the size of TxQ.

Figure 8:
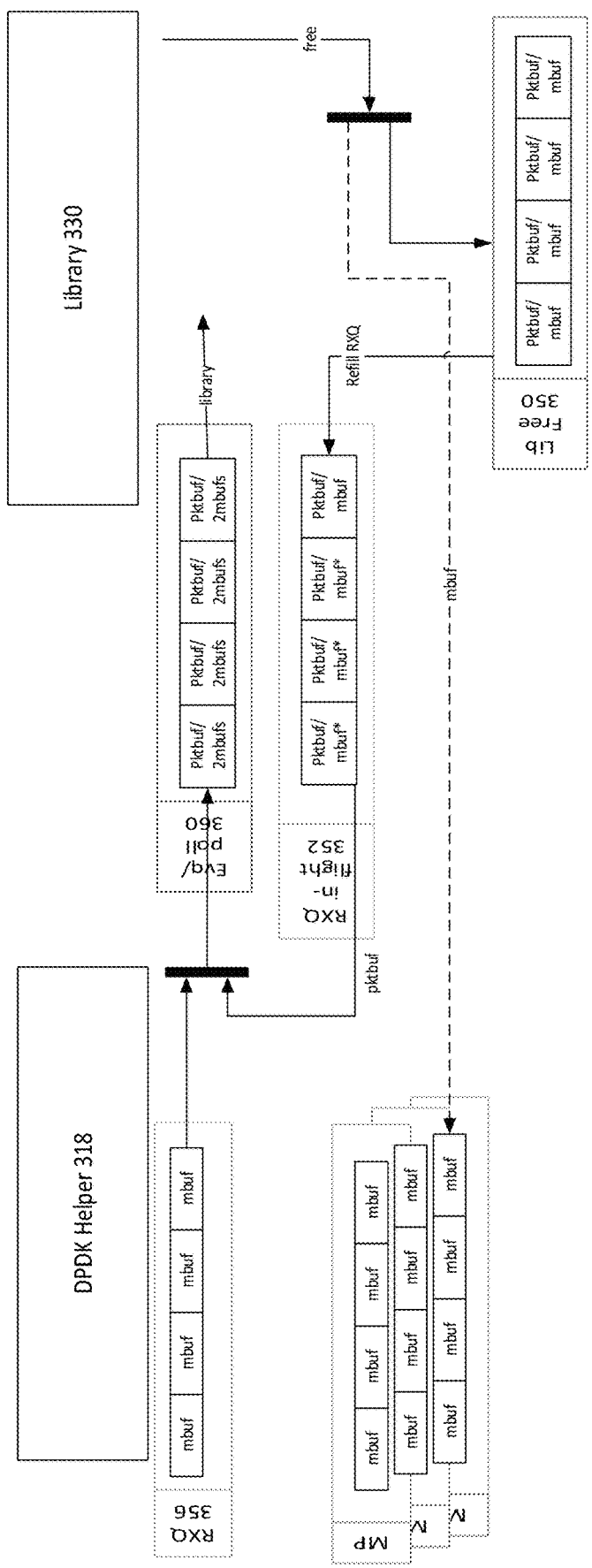
FIG. 8 shows a second example of usage of a shared memory in some embodiments.

To address one or more of the above considerations:

Ad 1) In this regard, reference is made to FIG. 8, which shows the receive queue functionality. This is similar to the arrangement of FIG. 7 with the following differences. Sets of memory pools are provided on the DPDK helper side. Further, on an RX temporary, an additional association between packet header and receive memory buffer (to be freed on return to user level protocol processing stack free pool) is provided.

Ad 2, 3 and 4) use OvS mempool

DPDK HW layer may need to know whether it works in Direct HW or OvS mode and the mode of each PMD.

In some embodiments, a MAC filter (at user level) may be provided to receive all the traffic destined to that MAC, and then route any traffic that the user level protocol processing stack does not want to handle (e.g. ARP) back to the kernel stack.

The user level protocol processing stack may support multiple independent stacks running over the same hardware interface (function) by allocating a VI per stack and then using specific L3/L4 filters to direct appropriate traffic to each one.

Some embodiments may use MAC filters and have a DPDK taking over an entire interface.

Many PMDs support multiple functions, and some also support VMDQ that allows multiple queues with different MAC filters on the same function.

Some embodiments may have stack per function, sharing a MAC filter. An alternative would be to have multiple user level protocol processing stack stacks share a DPDK queue with a software layer that can direct the appropriate subset of DPDK traffic to the corresponding user level protocol processing stack VI. For example, the NIC emulation layer shifts descriptors between user level protocol processing stack and DPDK to also do some software filtering.

The use of the KNI device can provide the OS IP interface, and allow the user to configure it appropriately in the normal way. Packets that the OS sends to this interface need to make it on to the wire. The helper process may do this in the same way that it will for traffic sent from the user level protocol processing stack VIs in the kernel.

Thus one NIC, a logical port may thus be associated with a single KNI. A function may be provided per MAC. A function is provided per port. RSS may be on its own function and may have a plurality of queues.

On another NIC, a MAC filter may be used per queue with one or more queues on a logical port. There may be KNI for each queue. Thus, there may be more than one KNI associated with a given logical port. The KNI may have MACVLAN aliases defined. A function may have one or more queues. A function may be provided per logical port.

In another NIC, a MAC filter per queue may be supported. A logical port may be associated with one function or more than one function. A function may have one or more queues. There may be a mechanism of routing some traffic to different functions. For example, port 80 or TCP traffic on one queue of a first function may be routed to a queue of a second function. The first and second functions may be on the same logical port. The second function may be a RSS function. Clusters may be on different functions. The second function may handle the passive port 80 connections for the respective queue of the first function. The helper may set up the KNI as a main interface and KNI MAC VLAN instances to cover queues of the first function other than the queue associated with port 80.

Some queues/MACVLAN interfaces may be grouped into a same logical port so that the same stack may use them. Bifurcation may be preconfiguring the hardware and these queue may get traffic redirected from another function which has MACVLAN interfaces pre-set.

Some embodiments may be used to accelerate nginx-type workloads. Nginx is a web server. Nginx may be used as a reverse proxy, load balancer and HTTP cache.

Some embodiments may be implemented in a containerized environment. This is a form of computer virtualization where the kernel of the operating system supports a number of containers. Each container supports an instance of a user space. Each container is separate from the other and provides a degree of security if separation of the different containers.

Name spaces are used to create containers. When a Linux process is stared, the kernel can give the process access to particular names spaces such that the state which is visible to that process is restricted and may be unique to the namespace In the arrangement of FIG. 5, each of the cores may be provided in separate containers. The helper process may be in one name space and the application process may be in another name space.

In another embodiment, the helper instances may each be provided in its own container and the applications each provided in their own containers.

The embodiments may be implemented by computer software executable by a data processor ice, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), as non-limiting examples.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

We claim:

1. A method for transmitting data comprising:
    forming, by means of an application, data to be transmitted;
    writing the data to a data buffer;
    using (i) a first non-operating system functionality, provided at a user level, configured to support a network interface device, and (ii) a second non-operating-system functionality, provided at the user level, configured to perform protocol processing, to cause the data to be transmitted over a network via the network interface device, wherein the first non-operating system functionality comprises a data plane development kit (DPDK) functionality;
    in response to the application being determined to be unresponsive, accessing by an operating system the data buffer and its corresponding connection state and requesting transmission of the data in said data buffer utilizing a first data plane development kit helper process, said first data plane development kit helper process being an operating system functionality executing at user-mode; and
    after polling data plane development kit queues, using said first data plane development kit helper process to cause descriptors from said data plane development kit functionality of the first non-operating system functionality to be written to a pseudo virtual interface to provide a communication path, while the application is unresponsive, between the operating system and the network interface device, to cause the data to be transmitted over the network via the network interface device while the application is unresponsive.

2. The method as claimed in claim 1, wherein the DPDK functionality comprises a poll mode driver (PMD) configured to provide one or more application programming interfaces, through a library running in a user space, to configure the network interface device and a queue of the network interface device.

3. The method as claimed in claim 1, comprising using virtual interface code to communicate between said user level and a kernel.

4. The method as claimed in claim 1, comprising using by said pseudo virtual interface the descriptors to poll a protocol processing function provided by said operating system executing in kernel mode for updated descriptors.

5. The method as claimed in claim 4, wherein the polling causes a retransmission to be performed via the first helper process.

6. The method as claimed in claim 5, wherein the polling causes a scheduling of said application.

7. The method as claimed in claim 4, wherein the method comprises causing by the first helper process said updated descriptors to be written from the pseudo virtual interface to the DPDK functionality.

8. The method as claimed in claim 1, wherein the method comprises indicating, using a second helper process, to the operating system a state of said first non-operating system functionality.

9. The method as claimed in claim 1, wherein the method comprises indicating, using a second helper process, to the operating system a presence of data in said data buffer for a given amount of time.

10. The method as claimed in claim 1, wherein the method comprises indicating, using a second helper process, to the operating system that an interface requires attention.

11. The method of claim 1, wherein the method comprises communicating with a first network interface device via said first non-operating system functionality and with a second network interface device via user mode virtual interface code and virtual interface code in said operating system.

12. A data processing system comprising:
    a processor subsystem having access to a memory and a network interface device capable of supporting a communication link;
    a first non-operating system functionality, provided at a user level, configured to support the network interface device, wherein the first non-operating system functionality comprises a data plane development kit (DPDK) functionality;
    a second non-operating system functionality, provided at the user level, configured to perform protocol processing;
    an application configured in a transmit mode to, while executing on the processor subsystem, form data to be transmitted and cause the data to be written to a data buffer, said first and second non-operating system functionalities of the data processing system causing the data to be transmitted over a network via the network interface device; and
    an operating system configured to, while executing on the processor subsystem in kernel mode and in response to the application being determined to be unresponsive, access the data buffer and its corresponding connection state and request transmission of the data in said data buffer utilizing a first data plane development kit helper process, said first data plane development kit helper process being an operating system functionality executing at user-mode, wherein said first data plane development kit helper process is configured to cause descriptors after polling data plane development kit queues from said data plane development kit functionality in the first non-operating system functionality to be written to a pseudo virtual interface to provide a communication path, while the application is unresponsive, between the operating system and the network interface device, to cause the data to be transmitted over the network via the network interface device while the application is unresponsive.

13. A data processing system as claimed in claim 12, wherein said DPDK functionality comprises a poll mode driver (PMD).

14. A data processing functionality as claimed in claim 12, comprising using virtual interface code to communicate between said user level and a kernel.

15. A data processing system as claimed in claim 12, wherein said descriptors written to said pseudo virtual interface are used by said pseudo virtual interface to poll a protocol processing function provided by said operating system executing in the kernel mode for updated descriptors.

16. A data processing system as claimed in claim 15, wherein said polling is configured to cause a retransmission to be performed via the first helper process.

17. A data processing system as claimed in claim 15, wherein said polling is configured to cause scheduling of said application.

18. A data processing system as claimed in claim 12, comprising a library executing at user mode to provide said second non-operating system functionality.

19. A data processing system as claimed in claim 15, wherein said first helper process is configured to cause said updated descriptors to be written from the pseudo virtual interface to the DPDK functionality.

20. A data processing system as claimed in claim 12, wherein said data buffer is provided in address space accessible by said application and said operating system.

21. A data processing system as claimed in claim 12, comprising a second helper process configured to indicate to the operating system a state of said first non-operating system functionality.

22. A data processing system as claimed in claim 12, comprising a second helper process configured to indicate to the operating system a presence of data in said data buffer for a given amount of time.

23. A data processing system as claimed in claim 12, comprising a second helper process configured to indicate to the operating system that an interface requires attention.

24. A data processing system as claimed in claim 21, wherein said second helper is provided on a first core and said second helper is provided on a different core, said application being provided on said different core.

25. A data processing system as claimed in claim 24, comprising at least one further application, each application being on a different core with a respective first helper process.

26. A data processing system as claimed in claim 25, wherein said second helper process is configured to control each of said respective first helper processes.

27. A data processing system as claimed in claim 12, comprising a first network interface device and a second network interface device, said first network interface device configured to communicate with said application via said first non-operating system functionality and said second network interface device configured to communicate with said application via user mode virtual interface code and virtual interface code in said operating system.

28. A non-transitory computer readable medium encoded with instructions for controlling a data processing system, in which the instructions when executed enable the execution of the steps of:
    forming, by means of an application, data to be transmitted;
    writing the data to a data buffer;
    using (i) a first non-operating system functionality, provided at a user level, configured to support a network interface device, and (ii) a second non-operating-system functionality, provided at the user level, configured to perform protocol processing, to cause the data to be transmitted over a network via the network interface device, wherein the first non-operating system functionality comprises a data plane development kit functionality;
    in response to the application being determined to be unresponsive, accessing by an operating system the data buffer and its corresponding connection state and requesting transmission of the data in said data buffer utilizing a first data plane development kit helper process, said first data plane development kit helper process being an operating system functionality executing at user-mode; and
    after polling data plane development kit queues, using said first data plane development kit helper process to cause descriptors from said data plane development kit functionality of the first non-operating system functionality to be written to a pseudo virtual interface to provide a communication path, while the application is unresponsive, between the operating system and the network interface device, to cause the data to be transmitted over the network via the network interface device while the application is unresponsive.

* * * * *